Jan. 15, 1963  C. THUMIM  3,073,201
VIBRATING BLADE CUTTING MACHINE
Filed June 23, 1959  2 Sheets-Sheet 1
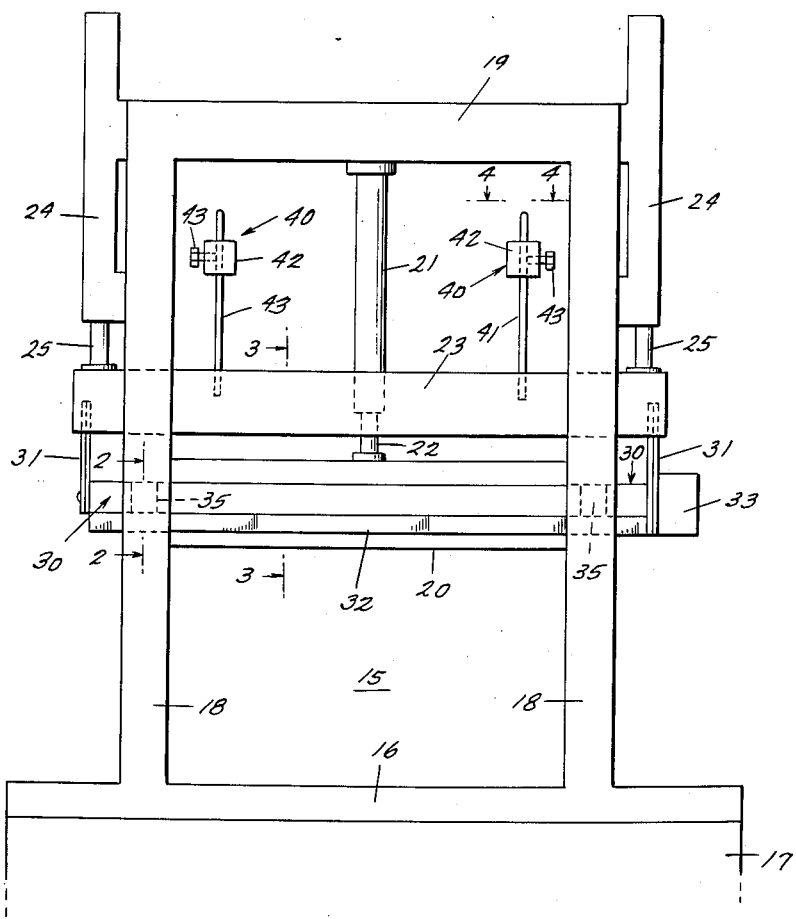
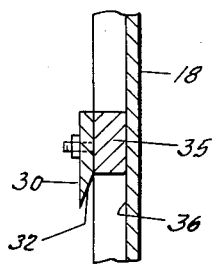
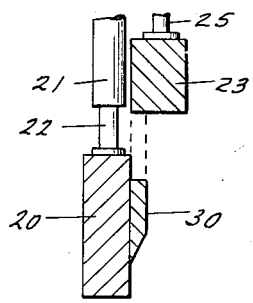
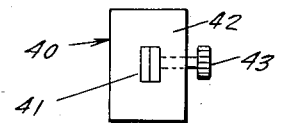
INVENTOR.
CARL THUMIM
BY *Ostrolenk, Faber*
*Gerb & Soffen*
ATTORNEYS Jan. 15, 1963 C. THUMIM 3,073,201
VIBRATING BLADE CUTTING MACHINE
Filed June 23, 1959
2 Sheets-Sheet 2
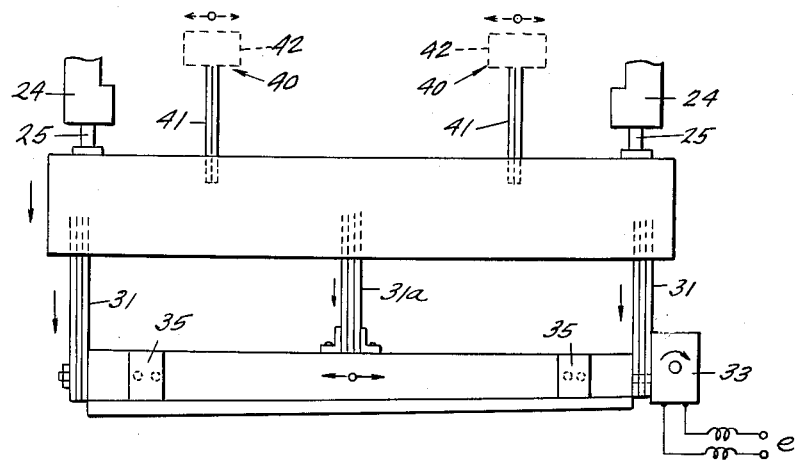
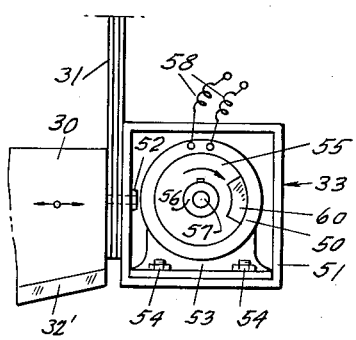 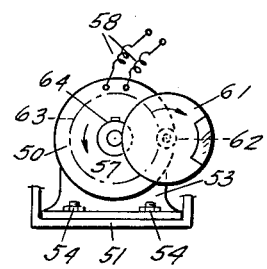
INVENTOR.
CARL THUMIM
BY Ostrolenk, Faber,
Gerb & Soffen
ATTORNEYS

United States Patent Office 3,073,201
Patented Jan. 15, 1963

3,073,201
VIBRATING BLADE CUTTING MACHINE
Carl Thumim, Westbury, N.Y., assignor, by mesne assignments, to Miehle-Goss-Dexter, Inc., Chicago, Ill., a corporation of Delaware
Filed June 23, 1959, Ser. No. 822,259
16 Claims. (Cl. 83—647.5)

The invention relates to cutting machines and more particularly relates to cutters arranged with a novel vibratory knife blade.

Conventional cutting machines for stacks of paper sheets, wood veneers, plastic, fiberboard, etc., generally utilize a guillotine type of blade to transversely shear the material. The downward thrust is accompanied by a relatively long transverse travel or slicing motion of the blade. For example, a machine for commercially cutting paper stacks is built to displace the cutting blade about twelve inches for only a six inch stack. This requires an appropriately wider machine and costly transversing mechanism.

In accordance with the present invention the cutting blade is resiliently suspended from the knife bar and oscillated perpendicularly to the direction of cutting. A relatively small amplitude of oscillation is sufficient to impart an effective shearing action to the knife blade. The blade oscillation in its downward cutting through the material effects a cutting action comparable with the prior transverse travel thereof. However, no unidirectional transverse displacement of the blade is required in my novel cutter system. Its oscillation amplitude need be no greater than only about one-eighth of an inch although a greater or smaller amplitude is feasible.

The invention system is readily adaptable to cutters for stacks as high as five feet or more without attendant widening of the machine as no blade transversing is required. It is thus practical to construct cutters to directly trim-out the sides or edges of five foot paper stacks as they arrive to a printing shop from the mill. Current practice is to trim to size in approximately six inch batches, a laborious costly process. The invention system can trim such five foot piles, and not be wider than the basic blade and its mount. Using the twenty inches per second transverse travel rate of conventional machines, it is seen that my invention system avoids a 200 inch blade traverse for a five foot pile.

In an exemplary form of my invention the knife blade is suspended from the knife bar by leaf springs that are stiff in the vertical direction yet resilient in the cutting direction. A mechanical oscillation generator, perferably an electric motor with an eccentric element, is coupled to the blade. The cutting blade is arranged to be vibrated by the eccentric motor unit while it effects the cutting. Desirably, the frequency of vibration is selected at or reasonably close to the mechanical resonant frequency of the resiliently suspended blade system, as will be set forth in detail hereinafter. For some applications, particularly smaller units, vibratory crystals or transducers may be used to impart the vibratory blade motion. Also, to minimize vibratory effects on the remainder of the cutting machine I incorporate a novel resonant absorber arrangement.

It is accordingly an object of the present invention to provide a novel cutting machine with a vibratory knife blade.

Another object of the present invention is to provide a novel cutting machine having a transverse knife blade resiliently suspended and mechanically oscillated.

A further object of the present invention is to provide a novel cutting machine with a knife blade oscillated in the cutting direction at a frequency near its mechanical resonance.

Still another object of the present invention is to provide an oscillatory blade assembly that is motivated transverse to its oscillating direction for effective cutting with negligible oscillation interference.

Still a further object of the present invention is to provide a novel mechanical resonance absorber system for machines with induced vibrations.

These and other objects of my invention will become more apparent from the following description of an exemplary embodiment thereof, illustrated in the drawings, in which:

FIGURE 1 is a front elevational view of the exemplary cutting machine.

FIGURE 2 is a cross-sectional view through the knife blade, taken along the line 2—2 of FIGURE 1.

FIGURE 3 is a cross-sectional view through the cutter assembly, taken along the line 3—3 of FIGURE 1.

FIGURE 4 is a plan view of one of the vibration absorbers as seen along the line 4—4 of FIGURE 1 in the direction of the arrows.

FIGURE 5 is an elevational view of a modified cutter assembly in accordance with the invention.

FIGURE 6 is an enlarged elevational view of the blade vibratory device.

FIGURE 7 is an elevational view of a modified vibratory device.

The cutting machine 15 of FIGURE 1 is shown of general form, it being understood that other overall constructions for paper stacks, wood veneer piles, cardboard, etc. are also contemplated for the invention system. The stack is placed on work table 16 in the usual manner and is adjusted in position for edge trim or cutting by a usual back gauge (not shown). The machine 15 is supported on a firm base 17 having vertical upright or guides 18, 18 for the cutting mechanism. A cross-bar 19 holds vertical guides in a rigid framework.

A transverse clamp 20 is arranged to move upon the stack in the cutting cycle somewhat preceding the knife blade to hold the stack firm for cutting. A hydraulic piston 21 depends from cross-bar 19 to motivate a piston 22 attached to clamp 20 for this purpose. The motivation of clamp 20 by cylinder 21 and piston 22 is properly timed in the sequence of cutting, as is its return, in a manner well established in the art. Similarly, the knife bar 23 is motivated by a pair of hydraulic cylinder units 24, 24 respectively supported on vertical guides 18, 18. Their pistons 25, 25 press the knife bar 23 downwardly for the cutting operation and return, in a manner well established in the art. Similarly, the knife bar 23 is motivated by a pair of hydraulic cylinder units 24, 24 respectively supported on vertical guides 18, 18. Their pistons 25, 25 press the knife bar 23 downwardly for the cutting operation and return, in a cylinder cutting control (not shown).

In accordance with the present invention the knife blade 30 is suspended from the knife bar 23 in a resilient manner that is yieldable practically solely along the cutting plane, namely from right to left in the view of FIGURE 1. The degree of transverse resiliency is preferably proportioned to effect optimum vibratory displacements of blade 30 by a motor driven or other transducer, as will be described in detail hereinafter. Towards this end, the exemplary cutter machine 15 utilizes a spring support 31, 31 for knife blade 30. Leaf-type spring arrays 31, 31 extend from the knife bar 23 end regions. Knife blade 30 is suitably secured to springs 31, 31 at its ends. The springs 31 may be several layers of thin flat spring steel or equivalent material to provide the elasticity factor for the vibratory action.

The spring 31 layers are perpendicular to the plane of the knife blade 30. The spring supports 31, 31 are sufficiently rigid in the vertical direction to operate the knife blade 30 in its vertical shearing or cutting mode. The cutting edge 32 may be parallel to the work table 16 and stacks, as seen in FIGURE 1, or inclined thereto in guillotine fashion as seen in FIGURE 5 or of other preferred form.

The downward pressure of knife edge 32 upon the work stack (not shown) through the knife bar 23 and springs 31, 31 effects a shearing or cutting thereof. However, in the prior art it has been essential to transversely motivate the knife blade 30 as well as move it down against the stack for any practical or commercial performance. A currently used rate is 20 inches per second across, as stated hereinabove. My invention obviates such transverse displacement of the knife blade, and can produce equivalent and more rapid cutting cycles.

An important feature of my invention is the utilization of a vibratory generator 33 to transmit or otherwise induce vibration of the knife blade 23 in its cutting plane simultaneously with the cutting or shearing action. The vibratory generator 33 is suitably secured to one end of blade 30 as seen in FIGURES 1, 5 and 6. Generator 33 produces a mechanical oscillation of resiliently suspended blade 30 in the plane of the blade. The exemplary cutter machine 15 contemplates the use of an electric motor with an eccentric member as illustrated in FIGURES 6 and 7, and to be described. However, other mechanical vibratory mechanisms may be used as generator 33, including piezo-electric transducers for lighter cutting loads.

As shown in FIGURES 1 and 2, knife blade 30 has two spaced guide blocks 35, 35 suitably secured thereto. Blocks 35, 35 are arranged to ride in respective channels 36 within vertical guides 18, 18. The knife blade 30 is pressed towards guides 18, 18 and maintained in its cutting plane by clamp 20 (see FIGURE 3). The guide blocks move against the interior surfaces of channels 36, 36. Blade 30 is thus maintained in its predetermined cutting plane during its vertical motion and transverse vibratory motion. The knife blade 30 is prevented from twisting out of its cutting plane. Other equivalent arrangements therefor are feasible.

The clamp 20 is moved in a vertical plane, downwardly against the stack, and back, as stated above. FIGURE 3 is a cross-sectional view through the clamp 20, shown juxtaposed with knife blade 30 and ahead of it downwardly in the cycle, in a conventional manner. However it is noted that the knife blade 30 is separated from fixed engagement with knife bar 23, in resilient connection by the leaf springs 31. It is understood that the clamp 20 and knife bar 23 are suitably held in vertical plane guidance. Clamp 20 for example may have end tongues that ride in rails or grooves in sides of guides 18, 18.

An important feature of my invention herein is the arrangement with the vibratory cutter hereof of a dynamic absorber system. Thus vibrations beyond the knife blade are absorbed and do not pass to the remainder of the machine 15. The exemplary absorbers 40, 40 are incorporated with the knife bar 23 and comprise vertical springs 41, 41 anchored at lower ends in bar 23, and adjustably positioned mass units 42, 42. The vertical springs 41, 41 may be resilient rods or leaf springs. The mass units 42, 42 are of appropriate weight to comprise individual vibration absorbers 40 for knife bar 23.

The vibration absorbers 40, 40 are preferably made to be resonant or near resonance to the transverse vibration frequency applied to knife blade 30 by generator 33. The vibration plane or mode of absorbers 40, 40 is in or parallel to the plane of vibration of the blade 30. The vibration of absorbers 40, 40 is induced and controlled by the vibrations of the suspended blade 30 as transmitted to knife bar 23. Thus the frequency of vibration of absorbers 40, 40 is identical to that of the blade transverse vibrations per generator 33.

The phase of the absorber vibrations is opposite or 180° out-of-phase to that of the knife bar 23 to which they are attached. In this way vibration absorption is effected in the knife bar 23. As the absorbers 40, 40 are at or near the induced frequency of vibration in their vibration mode, they are proportioned in mass and elasticity to effectively take up the unwanted vibrations in bar 23. The frequency of vibration of each absorber 40 is adjusted as close to resonance with the said vibration frequency by empirically setting each mass unit 42 in its vertical position on its associated spring 41. The vibration absorbers 40, 40 effectively minimize or even eliminate the transverse vibrations in knife bar 23.

FIGURE 5 shows the knife bar 23—knife blade 30 assembly, per se, in a slightly modified version. Besides the two end leaf springs 31, 31 (of FIGURE 1), there is an additional central leaf spring 31a. This illustrates also a guillotine-type blade edge 32', tapered from left to right. FIGURE 5 shows the principle that any number of springs can be used to suspend knife blade 30, for requisite composite vertical stiffness. Also, the transverse composite elasticity (with coefficient $k$) of the several springs 31, 31a, 31 determines the natural transverse resonance frequency ($f_0$) of vibration of blade 30 when taken in conjunction with the total mass $m$ of blade 30 and that of all its appendages such as attached generator 33. Such resonance frequency ($f_0$) is established by the well known formula $\sqrt{k \div m}$.

The frequency of induced transverse vibration of oscillation of blade 30 is optimumly established equal to or near the said blade resonant frequency $f_0$. In this way one derives the maximum amplitude of transverse blade displacement for a given oscillation energy output of generator 33. Typically, the knife blade 30 and generator 33 weight may total 20, 40 or 100 pounds. The vibration frequency established by generator 33 may practicably be in the range of 50 to 1000 cycles. Also the motor drive for the generator 33 (see FIGURES 6 and 7) may be in the range of one-half to ten horsepower. Other blade-generator weights, vibration frequencies, and motor powers are of course contemplated in the invention system.

It is not essential that the generator 33 frequency output induced in blade 30 be near the blade-generator 30, 33 resonant frequency $f_0$. Further, the invention contemplates cutter applications with small transverse vibrations having sonic or super-sonic vibrations by a generator in the range up to 25 kilocycles or higher. Ceramic transducers may be used therefor. In some arrangements a portion of the generator is fastened to the machine frame as a springboard or reference base for the vibrations. Ceramic type transducers have relatively smaller vibration power output, they are applicable for blades of smaller mass, which in turn leads to the higher inherent resonant frequency ($f_0$) desired therewith.

For sizable commerical cutting machines, with blade 30 assemblies weighing 10 pounds up, I have found conventional induction motor drives suitable for the generator unit 33. FIGURE 6 shows an exemplary unit 33 using an electric motor 50 as a vibration generator. A rigid housing 51 for unit 33 is bolted at 52 or otherwise secured with the blade-spring 30, 31 assembly. The base 53 of motor 50 is bolted at 54, 54 to the housing 51. A disc or wheel 55 is secured at its hub 56 to shaft 57 of motor 50. The exemplary motor 50 is a single or polyphase induction motor connected by flexible leads 58 to a suitable source of power.

The unit 33 of FIGURE 6 employs an eccentric weight or load on motor 50. This is effected by a peripheral segment 60 in disc 55. The relative weight or eccentricity of load 60, and its radial position determines the force and therefor amplitude of the transverse displacement. With the plane of rotation of disc and weight 55, 60 arranged in or parallel to the plane of the knife blade, the oscillatory or vibratory effect produced by the eccentric load 60 is transmitted to the knife blade 30, as will now be understood.

As stated hereinabove, the resonant frequency of the blade 30—springs 31 combination (and unit 33) is preferably though not necessarily arranged to approximate or equal that of generator 33. When so optimized the size or power of motor 50 is minimum for a given cutter machine. A 3300 r.p.m. induction motor 50, with a one-to-one vibration effect due to disc 55, produces 55 cycles or oscillations per second on blade 30. The current commercial transverse cutting blade displacement of approximately 10 inches for a six inch depth in one-half second is at a 20 inch per second rate of traverse.

A vibration amplitude of the blade 30 to give a 20 inch transverse rate at 55 cycles is $\frac{2}{16}$ inch, for a side to side traverse of $\frac{2}{8}$ inch per cycle. Using a 4800 r.p.m. motor 50 in a one-to-one relation requires only a $\frac{1}{8}$ inch amplitude. For other than a 20 inch transverse rate one can select a corresponding combination of amplitude and motor speed. A stepped-up vibration rate can be accomplished by gearing up an eccentric disc to the motor shaft 57. FIGURE 7 illustrates an eccentric disc 61 with a hub gear 62 engaged with gear 63. The hub 64 of gear 63 is fastened with motor shaft 57.

Although I have described the present invention in connection with exemplary embodiments thereof, it is to be understood that modifications and changes may be made therein within the broader spirit and scope of the invention as set forth in the following claims.

I claim:

1. A cutting machine of the character described comprising a work support for supporting material to be cut, a knife support bar, a knife blade, resilient support means spacedly securing the knife blade to said knife support bar and means for maintaining and guiding said knife blade in a cutting plane, vibratory means coupled to said blade for producing a mode of vibration thereof in said cutting plane, means for reciprocating said knife support bar, wherein said blade is vibrated during the course of making a cut in said material.

2. In a cutting machine as set forth in claim 1, said vibratory means comprising a mass having cyclic motion in the plane of said blade.

3. In a cutting machine as set forth in claim 1, said vibratory means being carried by said blade.

4. In a cutting machine as set forth in claim 1, said resilient support means comprising leaf springs.

5. In a cutting machine as set forth in claim 1, said vibratory means effecting vibrations in said blade at a frequency corresponding to the natural frequency of the knife blade and the resilient support means.

6. In a cutting machine as set forth in claim 1, said vibratory means being carried by said knife blade and comprising an electric motor and an eccentric mass rotated thereby.

7. In a cutting machine as set forth in claim 1, including a vibration absorber carried on said knife support bar and comprising vibratable means resonant to the vibration frequency of said vibratory means.

8. In a cutting machine as set forth in claim 1, said resilient support means comprising spaced pluralities of leaf springs extending between said knife support bar and said blade.

9. In a cutting machine as set forth in claim 1, said vibratory means being carried by said blade, said resilient support means comprising leaf springs.

10. In a cutting machine as set forth in claim 1, said vibratory means being carried by said blade, including a vibration absorber carried on said knife support bar and comprising vibratable means resonant to the vibration frequency of said vibratory means.

11. In a cutting machine as set forth in claim 1, said vibratory means being carried by said blade, said vibratory means effecting vibrations in said blade at a frequency corresponding to the natural frequency of the knife blade and the resilient support means.

12. In a cutting machine as set forth in claim 1, said vibratory means being carried by said blade, said vibratory means effecting vibrations in said blade at a frequency corresponding to the natural frequency of the knife blade and the resilient support means, said resilient support means comprising spaced pluralities of leaf springs extending between said knife support bar and said blade.

13. In a cutting machine as set forth in claim 1, said vibratory means being carried by said blade, said resilient support means comprising leaf springs, said vibratory means effecting vibrations in said blade at a frequency corresponding to the natural frequency of the knife blade and the resilient support means.

14. In a cutting machine as set forth in claim 1, said vibratory means effecting vibrations in said blade at a frequency corresponding to the natural frequency of the knife blade and the resilient support means, including a vibration absorber carried on said knife support bar and comprising vibratable means resonant to the vibration frequency of said vibratory means.

15. In a cutting machine as set forth in claim 1, including a vibration absorber carried on said knife support bar and comprising vibratable means resonant to the vibration frequency of said vibratory means, said resilient support means comprising spaced pluralities of leaf springs extending between said knife support bar and said blade.

16. In a cutting machine as set forth in claim 1, said vibratory means effecting vibrations in said blade at a frequency corresponding to the natural frequency of the knife blade and the resilient support means, including a vibration absorber carried on said knife support bar and comprising vibratable means resonant to the vibration frequency of said vibratory means, said resilient support means comprising spaced pluralities of leaf springs extending between said knife support bar and said blade.

References Cited in the file of this patent

UNITED STATES PATENTS

| | | |
|---|---|---|
| 951,478 | Lindsay | Mar. 8, 1910 |
| 1,292,494 | Lorenz | Jan. 28, 1919 |
| 1,403,923 | Thompson | Jan. 17, 1922 |
| 1,491,432 | Stebbins | Apr. 22, 1924 |
| 1,746,662 | Legge | Feb. 11, 1930 |
| 1,955,004 | Lodge | Apr. 17, 1934 |
| 2,457,301 | Brand | Dec. 28, 1948 |
| 2,603,389 | Horton | July 15, 1952 |
| 2,718,699 | Soss | Sept. 27, 1955 |
| 2,750,840 | Sklarek | June 19, 1956 |
| 2,819,775 | Everett | Jan. 14, 1958 |